United States Patent
Mihara et al.

(10) Patent No.: US 10,323,750 B2
(45) Date of Patent: Jun. 18, 2019

(54) SEAL MECHANISM

(71) Applicant: IHI Corporation, Koto-ku (JP)

(72) Inventors: Rei Mihara, Tokyo (JP); Tomoya Kakuta, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/198,413

(22) Filed: Jun. 30, 2016

(65) Prior Publication Data

US 2016/0305553 A1 Oct. 20, 2016

Related U.S. Application Data

(63) Continuation of application No. PCT/JP2015/055049, filed on Feb. 23, 2015.

(30) Foreign Application Priority Data

Feb. 21, 2014 (JP) .................................. 2014-031553

(51) Int. Cl.
*F16J 15/322* (2016.01)
*F16J 15/3204* (2016.01)
(Continued)

(52) U.S. Cl.
CPC ......... *F16J 15/3204* (2013.01); *F16J 15/164* (2013.01); *F16J 15/322* (2013.01); *F16J 15/3228* (2013.01)

(58) Field of Classification Search
CPC .... F16J 15/3204; F16J 15/3228; F16J 15/322; F16J 15/164
(Continued)

(56) References Cited

U.S. PATENT DOCUMENTS 3,512,789 A * 5/1970 Tanner .................. F16J 15/121
  277/647
3,997,142 A * 12/1976 Broadway ............. F16K 1/2263
  251/307
(Continued)

FOREIGN PATENT DOCUMENTS

DE           3221526 A1   12/1983
DE   10 2007 063 216 A1    6/2009
(Continued)

OTHER PUBLICATIONS

Thermal expansion chart.*
(Continued)

*Primary Examiner* — Nathan Cumar
(74) *Attorney, Agent, or Firm* — Oblon, McClelland, Maier & Neustadt, L.L.P.

(57) ABSTRACT

A seal mechanism that is provided with an annular resin seal lip which is disposed coaxially with a shaft and is brought into contact with a circumferential surface of the shaft. The seal mechanism is provided with a stopper that is provided in a metallic housing surrounding the shaft and is disposed between the shaft and a portion of the seal lip other than the edge portion coming into direct contact with the shaft while spaced apart from the circumferential surface of the shaft. The stopper is made of a material having a thermal expansion coefficient smaller than that of a material of which the seal lip is formed, and an axis of the seal lip is caused to correspond to an axis of the shaft by coming into contact with the seal lip which is reduced in diameter at the time of cooling.

8 Claims, 4 Drawing Sheets

(51) Int. Cl.
*F16J 15/3228* (2016.01)
*F16J 15/16* (2006.01)

(58) Field of Classification Search
USPC ............... 277/549, 309, 349, 351, 353, 394
See application file for complete search history.

(56) References Cited

U.S. PATENT DOCUMENTS

| | | | | |
|---|---|---|---|---|
| 5,456,578 | A * | 10/1995 | Honda | B23K 35/304 |
| | | | | 415/173.1 |
| 5,524,846 | A * | 6/1996 | Shine | B64D 27/00 |
| | | | | 244/121 |
| 6,547,250 | B1 | 4/2003 | Noble et al. | |
| 2008/0145254 | A1 | 6/2008 | Sanada | |
| 2011/0215536 | A1* | 9/2011 | Itadani | F16J 15/322 |
| | | | | 277/562 |

FOREIGN PATENT DOCUMENTS

| | | |
|---|---|---|
| JP | 1-77169 U | 5/1989 |
| JP | 9-303568 | 11/1997 |
| WO | WO 2006/068047 A1 | 6/2006 |
| WO | WO 2010/061670 A1 | 6/2010 |

OTHER PUBLICATIONS

PTFE handbook p. 23 Dupont.*
Kaye&Laby thermal expansion (Year: 2010).*
International Search Report dated May 26, 2015 in PCT/JP2015/055049 filed Feb. 23, 2015 (with English translation).
Written Opinion dated May 26, 2015 in PCT/JP2015/055049 filed Feb. 23, 2015.

* cited by examiner

SEAL MECHANISM

This application is a continuation application based on a PCT Patent Application No. PCT/JP2015/055049, filed Feb. 23, 2015, whose priority is claimed on Japanese Patent Application No. 2014-31553, filed Feb. 21, 2014. The contents of both the PCT Application and the Japanese Application are incorporated herein by reference.

TECHNICAL FIELD

Embodiments described herein relates to a seal mechanism.

BACKGROUND

For example, seal mechanisms using a seal lip as shown in Patent Documents 1 and 2 have been used in the past. In such seal mechanisms, an inner edge portion of an annular seal lip is disposed in contact with a circumferential surface of a shaft, and the seal lip performs sealing while sliding with respect to the shaft when the shaft rotates.

CITATION LIST

Patent Document

[Patent Document 1]
International Patent Application Publication No. 2010/061670
[Patent Document 2]
International Patent Application Publication No. 2006/068047

SUMMARY

Meanwhile, since a rocket engine turbo pump or the like reaches cryogenic temperatures (e.g., about −200° C.), a seal mechanism using a seal lip is not used. This is because the seal lip is generally formed of a material such as an elastomer that becomes brittle at cryogenic temperatures. However, resin materials with high reliability even at cryogenic temperatures have been developed through recent technological developments, and a usage of a seal mechanism using the seal lip made of such a material in a cryogenic temperature environment as described above can be considered in the future.

However, since the materials with high reliability even at cryogenic temperatures are also resin materials, the materials have high thermal expansion coefficients with respect to a metallic shaft and similarly a metallic housing. That is, the contraction rate when changing from a normal temperature to a cryogenic temperature varies greatly between the resin seal lip and the metallic shaft and the housing. In such a case, when the seal lip contracts while maintaining the coaxial state with the shaft, the seal lip is required to be held about an axis by a uniform force. However, the seal lip is not necessarily held about the axis by the uniform force due to assembling errors and the like that are naturally present. Thus, even if the centering between the seal lip and the shaft is correctly performed at the normal temperature, there is a possibility of the axis of the seal lip and the axis of the shaft not corresponding to each other at the cryogenic temperature. When the axis of the seal lip and the axis of the shaft are offset, a deviation in the circumferential direction of the seal lip occurs in the pressure distribution of the seal lip with respect to the shaft. As a result, there is a possibility of the rotation resistance of the shaft increasing or sealing characteristics deteriorating.

The present disclosure has been made in view of the above-described problems, and an object thereof is to provide a seal mechanism having a seal lip and used at cryogenic temperatures that performs good sealing by causing the axis of the seal lip and the axis of the shaft to correspond to each other even at cryogenic temperatures.

The present disclosure adopts the following configurations as a means for solving the aforementioned problems.

A first aspect of the present disclosure includes a seal mechanism that is provided with an annular resin seal lip which is disposed coaxially with a shaft and is brought into contact with a circumferential surface of the shaft, wherein the seal mechanism is provided with a stopper that is provided in a metallic housing surrounding the shaft and is disposed between the shaft and a portion of the seal lip other than the edge portion coming into direct contact with the shaft while spaced apart from the circumferential surface of the shaft, the stopper is made of a material having a thermal expansion coefficient smaller than that of a material of which the seal lip is formed, and the axis of the seal lip is caused to correspond to the axis of the shaft, by bringing the stopper into contact with the seal lip which is reduced in diameter at the time of cooling.

The seal mechanism according to the present disclosure is provided with a stopper that is disposed between the shaft and a portion of the seal lip other than the edge portion coming into direct contact with the shaft while spaced apart from the circumferential surface of the shaft. Such a stopper is provided in the housing provided around the shaft and comes into contact with the seal lip when cooled. As a result, the seal lip contracts while supported by the stopper, and it is possible to define the position in the contraction process of the seal lip. Thus, the axis of the contracting seal lip can be caused to correspond to the axis of the shaft by the stopper. Therefore, according to the present disclosure, in the seal mechanism that has a seal lip and is used at cryogenic temperatures, it is possible to perform good sealing by causing the axis of the seal lip and the axis of the shaft to correspond to each other even at cryogenic temperatures.

DESCRIPTION OF EMBODIMENTS

Hereinafter, an embodiment of a seal mechanism according to the present disclosure will be described with reference to the drawings. In the following drawings, the scales of each member are properly changed to represent each member in a recognizable size.

(First Embodiment)

Figure 1A:
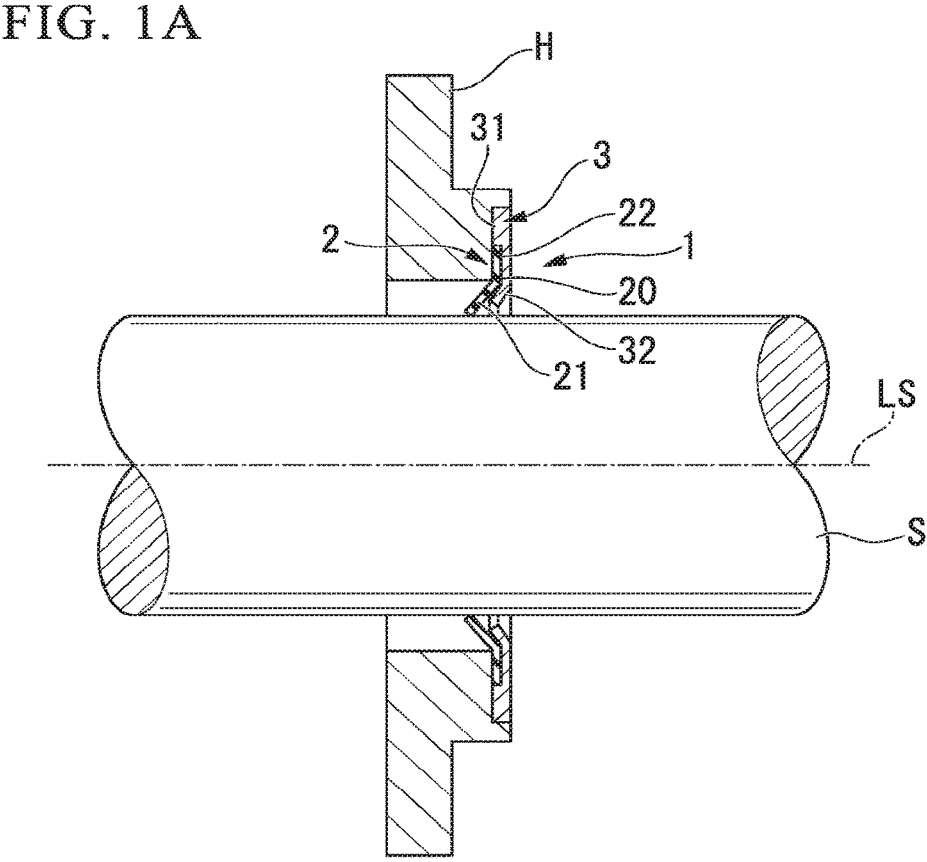
FIG. 1A is a cross-sectional view schematically representing a schematic structure of a seal mechanism of a first embodiment of the present disclosure.

FIG. 1A is a cross-sectional view schematically representing a schematic configuration of a seal mechanism 1 of the present embodiment. As shown in FIG. 1A, a seal mechanism 1 of the present embodiment is used by being incorporated into an apparatus (e.g., a rocket engine turbo pump) that has a shaft S and a housing H surrounding the shaft S and is used at cryogenic temperatures. Further, the shaft S and the housing H, for example, are metallic members formed of a nickel-based alloy and stainless steel. Further, FIG. 1A shows only some parts of the shaft S and the housing H.

Figure 1B:
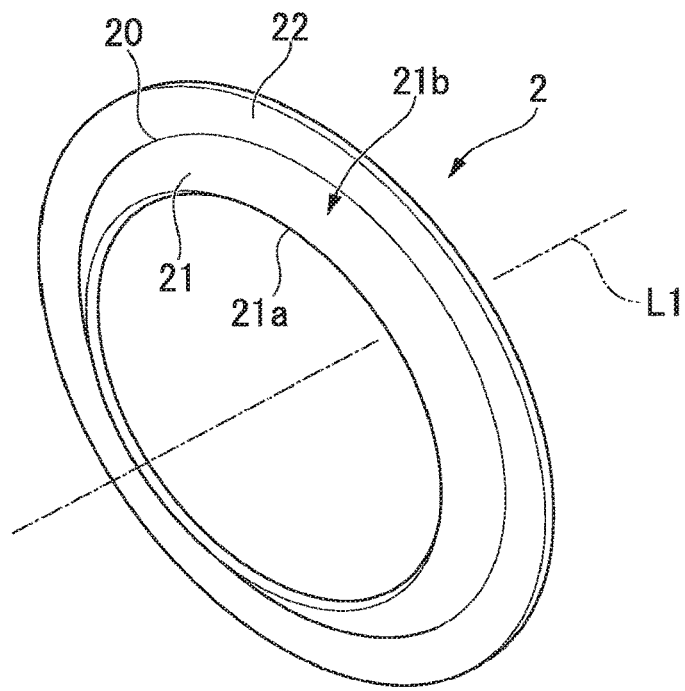
FIG. 1B is a perspective view of a seal lip provided in the seal mechanism of the first embodiment of the present disclosure.

As shown in FIG. 1A, the seal mechanism 1 is equipped with a seal lip 2 and a mounting part 3. FIG. 1B is a perspective view of the seal lip 2. As shown in FIG. 1B, the seal lip 2 is an annular member centered on the axis L1 and is bent in a substantially central portion in a direction perpendicular to an axis L1.

An inner portion 21 located inside the bent portion (hereinafter referred to as a bent portion 20) has a tapered shape in which an edge portion 21a of the axis L1 side is located on a high pressure side (a left side of the seal mechanism 1 in FIG. 1A) and in which a root portion 21b of the bent portion 20 side is located on a low pressure side (a right side of the seal mechanism 1 in FIG. 1A). That is, the shape of the inner portion 21 is set to narrow its diameter toward the high pressure side. The edge portion 21a of the inner portion 21 comes into contact with the outer circumferential surface of the shaft S as shown in FIG. 1A, and the edge portion 21a comes into slide-contact with the shaft S when the shaft S rotates.

An outer portion 22 located outside the bent portion 20 is a portion disposed outside the inner portion 21 and is a thin annular portion having front and back surfaces orthogonal to the axis L1. As shown in FIG. 1A, the outer portion 22 is a portion interposed between the mounting part 3 and the housing H, and functions as a mounting portion that is mounted on the housing H.

The seal lip 2 is a resin member formed of a resin material that does not easily become brittle at cryogenic temperatures. For example, polytetrafluoroethylene (PTFE), polyetheretherketone (PEEK) and the like are used as the material of the seal lip 2. In addition, the seal lip 2 may also be formed by utilizing a material obtained by adding polyetheretherketone using a polytetrafluoroethylene material as a base material, and a material obtained by adding polytetrafluoroethylene (another fluorine-based resin may also be used) using a polyetheretherketone material as a base material.

The aforementioned materials are all resin material and have thermal expansion coefficients higher than the metal material that forms the shaft S and the housing H. Therefore, the seal lip 2 contracts greatly when compared to the shaft S and the housing H when cooled to a cryogenic temperature from a normal temperature.

The seal lip 2 is mounted on the housing H so that the axis L1 overlaps the axis LS of the shaft S at normal temperatures (see FIG. 1A). That is, the seal lip 2 is disposed coaxially with the shaft S.

The mounting part 3 is a part that mounts the seal lip 2 on the housing H and performs centering of the seal lip 2 which contracts when cooled, and the mounting part 3 is equipped with a base portion 31 and a stopper 32.

The base portion 31 is an annular block-shaped part having substantially the same size as the outer portion 22 of the seal lip 2 when viewed in a direction along the axis LS of the shaft S. As shown in FIG. 1A, the base portion 31 is fixed by bolts or the like (not shown) with respect to the housing H to surround the outer portion 22 of the seal lip 2.

The stopper 32 is provided on the side closer to the axis LS of the shaft S than the base portion 31, and has a tapered shape in which a tip 32a (see FIGS. 2A and 2B) of the axis LS side is located near an inner portion 21 of the seal lip 2 and a root portion 32b (see FIGS. 2A and 2B) is located farther away from the seal lip 2 than the tip 32a. That is, the shape of the stopper 32 is set to narrow toward the seal lip 2 side. The stopper 32 is disposed so that the tip 32a enters between the root portion 21b of the seal lip 2 and the shaft S.

That is, the stopper 32 is disposed between the root portion 21b (a portion other than the edge portion 21a coming into direct contact with the shaft S) of the seal lip 2 and the shaft S to be spaced apart from the outer circumferential surface of the shaft S, and is provided has an annular shape and is coaxially provided around the axis LS of the shaft S.

Further, the stopper 32 is made of a material having a lower thermal expansion coefficient than the material of which the seal lip 2 is formed, and is formed of the same material as the housing H in the present embodiment. That is, when the housing H is formed of a nickel-based alloy, the stopper 32 is also formed of a nickel-based alloy. Further, the base portion 31 is also formed of the same material as the stopper 32. The base portion 31 and the stopper 32 are integrated to form a single mounting part 3. When the mounting part 3 is fixed to the housing H, the stopper 32 is provided at a predetermined position relative to the housing H.

The stopper 32 guides the deformation when the diameter of the seal lip 2 reduces so that the axis L1 of the seal lip 2 corresponds to the axis LS of the shaft S, by coming into contact with the root portion 21b of the seal lip 2 that is reduced in diameter when cooled.

Figure 2A:
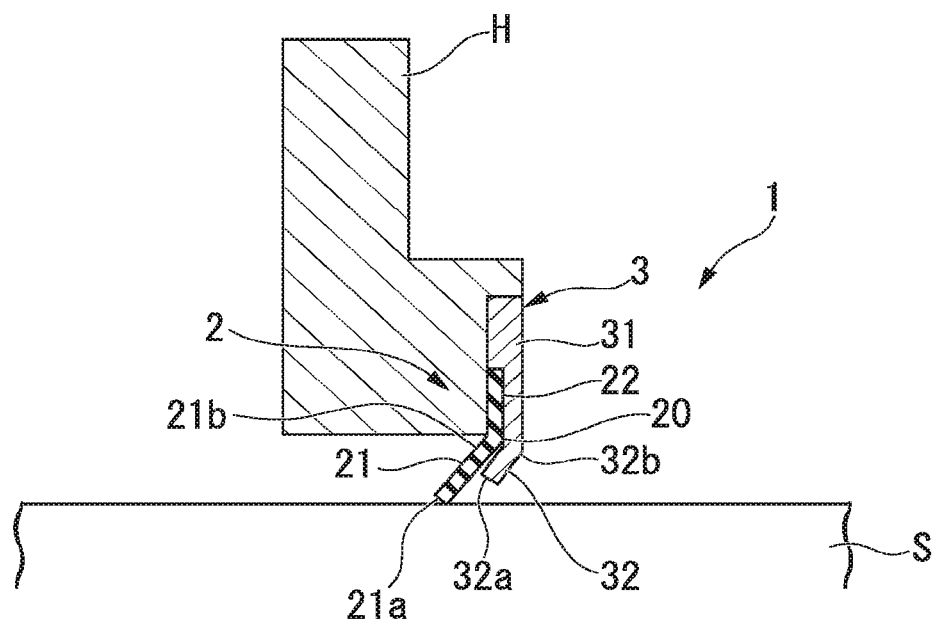
FIG. 2A is an enlarged schematic cross-sectional view including a portion of the seal mechanism of the first embodiment of the present disclosure under a normal temperature.
Figure 2B:
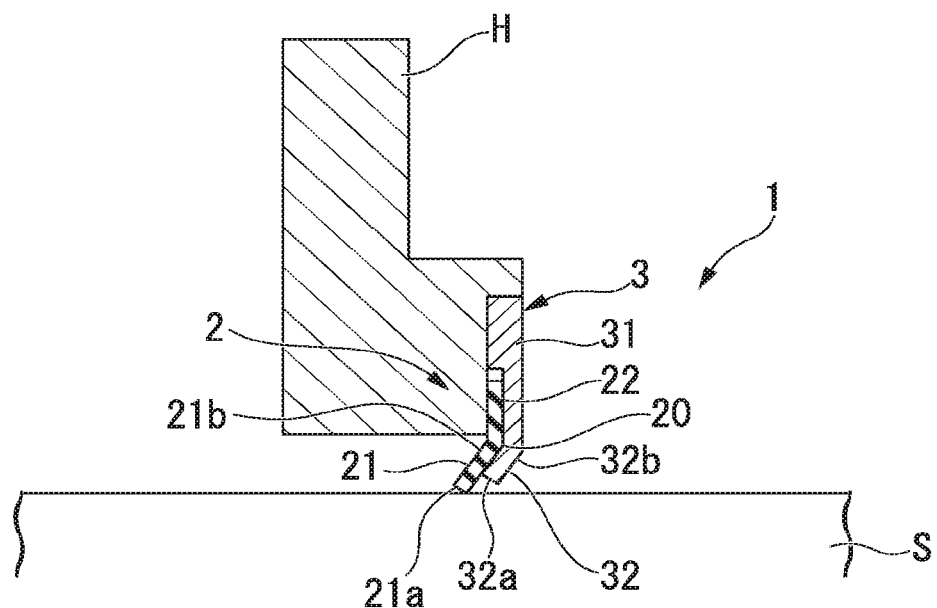
FIG. 2B is an enlarged schematic cross-sectional view including a portion of the seal mechanism of the first embodiment of the present disclosure under a cryogenic temperature.

FIG. 2A is an enlarged schematic cross-sectional view including a portion of the seal mechanism 1 at a normal temperature, and FIG. 2B is an enlarged schematic cross-sectional view including a portion of the seal mechanism 1 at a cryogenic temperature. As shown in FIG. 2A, under a normal temperature, a gap is formed between the stopper 32 and the root portion 21b of the seal lip 2. When the seal mechanism 1 is cooled and the seal lip 2 greatly contracts with respect to the housing H, the shaft S and the stopper 32, as shown in FIG. 2B, the root portion 21b of the seal lip 2 comes into contact with the stopper 32. Here, since the stopper 32 has an annular shape and is coaxially provided around the axis LS of the shaft S, the deformation of the seal lip 2 is supported by the stopper 32 so that the axis L1 of the seal lip 2 corresponds to the axis LS of the shaft S.

The seal mechanism 1 of the present embodiment is equipped with the stopper 32 that is disposed between the root portion 21b (a portion other than the shaft S coming into direct contact with the edge portion 21a) of the seal lip 2 and the shaft S while spaced apart from the circumferential surface of the shaft S. The stopper 32 is provided on the housing H provided around the shaft S and comes into contact with the seal lip 2 when cooled. As a result, when the seal lip 2 contracts while supported by the stopper 32, the position is defined in the contraction process of the seal lip 2. Thus, it is possible to cause the axis L1 of the contracting seal lip 2 to correspond to the axis S of the shaft LS by the stopper 32. Therefore, according to the seal mechanism 1 of the present embodiment, it is possible to perform good sealing by causing the axis LS of the seal lip 2 and the axis L1 of the shaft S to correspond to each other even at cryogenic temperatures.

Further, in the seal mechanism 1 of the present embodiment, the stopper 32 has an annular shape and is coaxially provided around the axis LS of the shaft S. Therefore, even when the seal lip 2 contracts to any degree, it is possible to cause the axis L1 of the seal lip 2 and the axis LS of the shaft S to correspond to each other more reliably by the contact between the stopper 32 and the seal lip 2.

Further, in the seal mechanism 1 of the present embodiment, the stopper 32 is formed of the same material as the housing H. Accordingly, since the stopper 32 and the housing H similarly contract when cooled, the relative positional relation of the stopper 32 with respect to the housing H does not change. Thus, a change in relative positional relation of the stopper 32 with respect to the axis LS of the shaft S is prevented even when cooled, which makes it possible to cause the axis L1 of the seal lip 2 and the axis L2 of the shaft S to correspond to each other more reliably.

(Second Embodiment)

Next, a second embodiment of the present disclosure will be described. In the present embodiment, the same parts as in the aforementioned first embodiment will not be described.

Figure 3A:
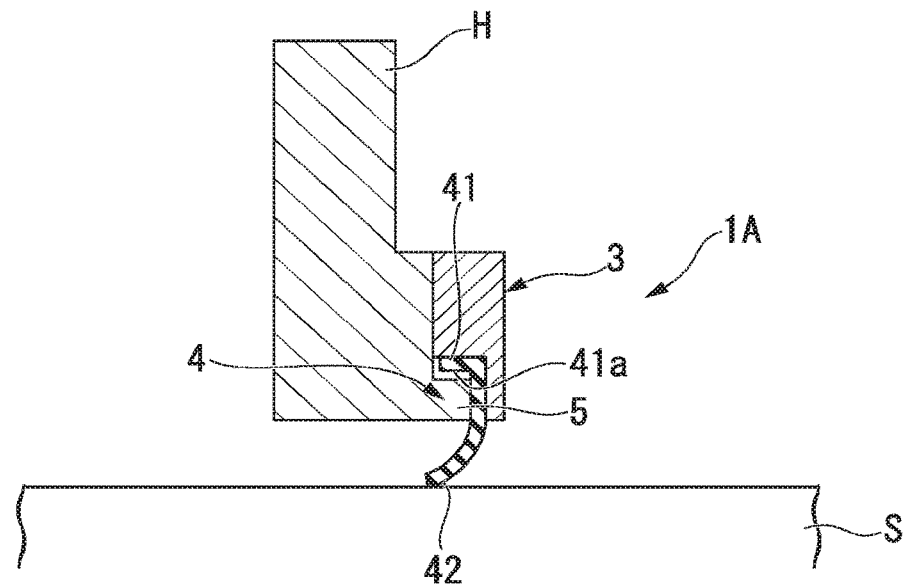
FIG. 3A is an enlarged schematic cross-sectional view including a portion of the seal mechanism of a second embodiment of the present disclosure under a normal temperature.
Figure 3B:
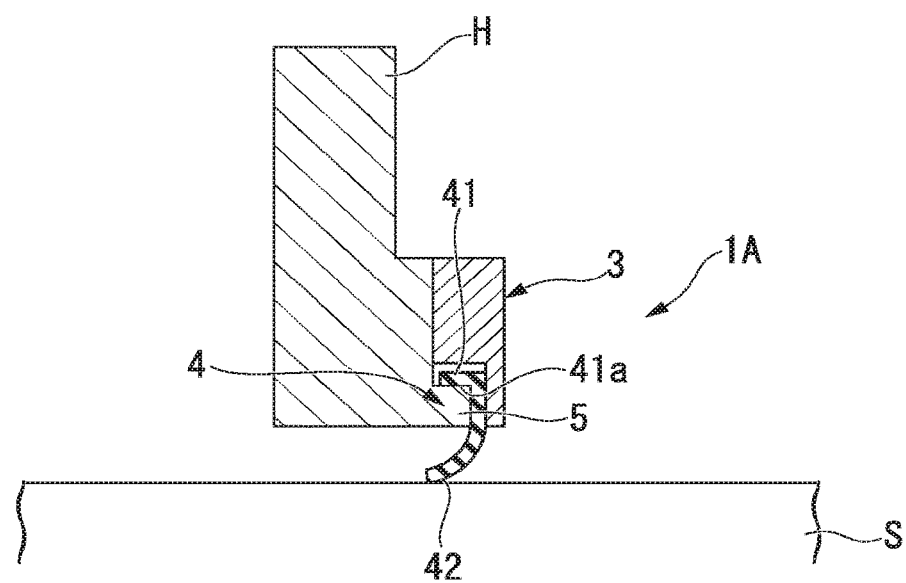
FIG. 3B is an enlarged schematic cross-sectional view including a portion of the seal mechanism of the second embodiment of the present disclosure under a cryogenic temperature.

FIGS. 3A and 3B are enlarged schematic cross-sectional views including a portion of the seal mechanism 1A of the present embodiment. Further, FIG. 3A is an enlarged schematic cross-sectional view including a portion of the seal mechanism 1 at a normal temperature, and FIG. 3B is an enlarged schematic cross-sectional view including a portion of the seal mechanism 1 at a cryogenic temperature.

As shown in FIGS. 3A and 3B, the seal mechanism 1A according to the present embodiment is equipped with a mounting part 3 which does not have the stopper 32 described in the aforementioned first embodiment, a seal lip 4 having a bent portion 41, and a stopper 5 provided integrally with the housing H.

The seal lip 4 has the same annular shape as the seal lip 2 of the first embodiment, and is disposed so that an inner edge portion 42 thereof comes into contact with the outer circumferential surface of the shaft S. The bent portion 41 of the seal lip 4 is provided at an end portion on the outer side of the seal lip 4 that is located at a position spaced further apart from the shaft S than the edge portion 42 coming into contact with the shaft S, and the bent portion 41 has a contact surface 41a disposed to face the shaft S side. The seal lip 4 is made of the same material as the seal lip 2 of the first embodiment.

The stopper 5 is formed of the same material as the housing H and is disposed between the bent portion 41 and the shaft S. The stopper 5 has an annular shape with a diameter smaller than that of the contact surface 41a of the bent portion 41, and as shown in FIG. 3A, an outer circumferential surface thereof is disposed to face the contact surface 41a of the bent portion 41. As shown in FIG. 3B, the stopper 5 guides the deformation at the time of diameter reduction of the seal lip 4 so that the axis of the seal lip 4 corresponds to the axis of the shaft S by coming into contact with the contact surface 41a of the seal lip 4 which is reduced in diameter when cooled.

In the seal mechanism 1A of the embodiment, similarly to the seal mechanism of the first embodiment, it is also possible to cause the axis of the contracting seal lip 4 to correspond to the axis of the shaft S by the stopper 5. Therefore, according to the seal mechanism 1A of the present embodiment, it is possible to perform good sealing by causing the axis of the seal lip 4 and the axis of the shaft S to correspond to each other even at cryogenic temperatures.

Furthermore, in the seal mechanism 1A of the present embodiment, since the contact surface 41a of the bent portion 41 faces the shaft S side to be orthogonal to the radial direction of the shaft S, it is possible to bring the stopper 5 into contact with the seal lip 4 from the front (a surface facing the contraction direction of the seal lip 4) of the contraction direction. Therefore, it is possible to reliably guide the seal lip 4.

While preferred embodiments of the present disclosure have been described with reference to the accompanying drawings, it is a matter of course that the present disclosure is not limited to the above-described embodiments. Various shapes or combinations of respective constituent elements shown in the above embodiment are merely examples, and various modifications can be made based on design requirements or the like within the scope that does not depart from the scope of the present disclosure.

Figure 4A:
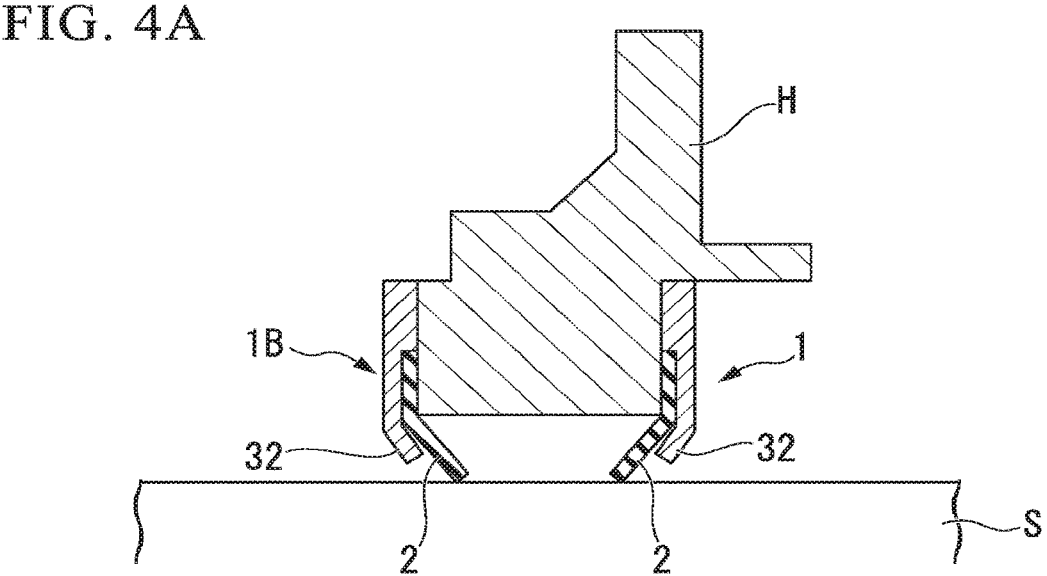
FIG. 4A is an enlarged schematic cross-sectional view of a modified example of the present disclosure under a normal temperature.
Figure 4B:
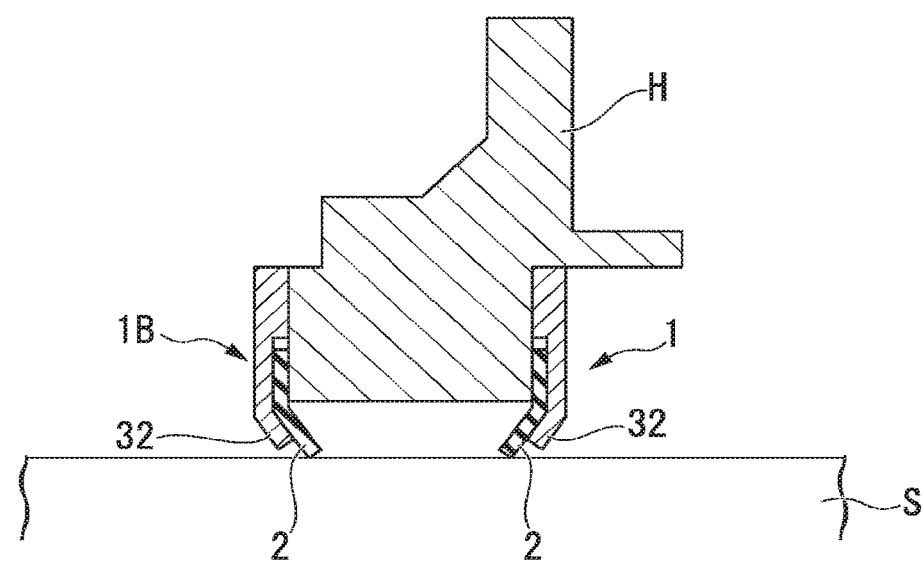
FIG. 4B is an enlarged schematic cross-sectional view of a modified example of the present disclosure under a cryogenic temperature.

FIGS. 4A and 4B are enlarged cross-sectional views schematically representing a modified example of the present disclosure. FIG. 4A is an enlarged cross-sectional view at the time of a normal temperature, and FIG. 4B is an enlarged cross-sectional view at the time of a cryogenic temperature. As shown in FIGS. 4A and 4B, a seal mechanism 1B having an inverted shape of the seal mechanism 1 may be installed on the high pressure side of the seal mechanism 1 of the first embodiment. In such a case, it is possible to provide a structure with high sealing properties by sealing a fluid such as a flushing gas between the seal mechanism 1 and the seal mechanism 1B.

INDUSTRIAL APPLICABILITY

In the seal mechanism having the seal lip and used at cryogenic temperatures, it is possible to perform a good seal by causing the axis of the seal lip and the axis of the shaft to correspond to each other even at cryogenic temperatures.

What is claimed is:
1. A seal mechanism comprising:
an annular resin seal lip which is disposed coaxially with a shaft, and has an outer portion which is directly mounted on a metallic housing surrounding the shaft and an inner portion which is bent with respect to the outer portion, the inner portion having an inner edge portion that is brought into direct contact with a circumferential surface of the shaft and a root portion located between the inner edge portion and the outer portion; and a stopper that is provided in the metallic housing and is disposed between the shaft and the root portion while spaced apart from the circumferential surface of the shaft, wherein the stopper is made of a material having a thermal expansion coefficient smaller than that of a material of which the annular resin seal lip is formed, and the seal mechanism has a first state in which a gap is formed between the stopper and the root portion, and a second state in which the stopper is brought into contact with the root portion by contraction of the annular resin seal lip at a time of cooling, the stopper guides a deformation of the annular resin seal lip due to contraction of the annular resin seal lip by the stopper coming into contact with the root portion and closing the gap such that an axis of the annular resin seal lip corresponds to an axis of the shaft.

2. The seal mechanism of claim 1, wherein the stopper has an annular shape and is coaxially provided around the axis of the shaft.

3. The seal mechanism of claim 1, wherein the stopper is formed of the same material as the housing.

4. The seal mechanism of claim 2, wherein the stopper is formed of the same material as the housing.

5. A seal mechanism comprising:

an annular resin seal lip which is disposed coaxially with a shaft, and has an inner edge portion that is brought into direct contact with a circumferential surface of the shaft and a bent portion which is located at a position spaced further apart from the shaft than the inner edge portion and has a contact surface facing the shaft side; and a stopper that is provided in a metallic housing surrounding the shaft and is disposed between the shaft and the contact surface of the bent portion while spaced apart from the circumferential surface of the shaft, wherein the stopper is made of a material having a thermal expansion coefficient smaller than that of a material of which the annular resin seal lip is formed, and the seal mechanism has a first state in which a gap is formed between the stopper and the contact surface of the bent portion, and a second state in which the stopper is brought into contact with the contact surface of the bent portion by contraction of the annular resin seal lip at a time of cooling, the stopper guides a deformation of the annular resin seal lip due to contraction of the annular resin seal lip by the stopper coming into contact with the contact surface and closing the gap such that an axis of the annular resin seal lip corresponds to an axis of the shaft.

6. The seal mechanism of claim 5, wherein the stopper has an annular shape and is coaxially provided around the axis of the shaft.

7. The seal mechanism of claim 5, wherein the stopper is formed of the same material as the housing.

8. The seal mechanism of claim 6, wherein the stopper is formed of the same material as the housing.

* * * * *